T. J. SLOAN.

Wood Screw.

No. 107.

Reissued Feb. 22, 1848.

N. PETERS. Photo-Lithographer. Washington, D. C.

UNITED STATES PATENT OFFICE.

THOMAS J. SLOAN, OF NEW YORK, N. Y.

IMPROVEMENT IN WOOD-SCREWS.

Specification forming part of Letters Patent No. 4,704, dated August 20, 1846; Reissue No. 107, dated February 22, 1848.

*To all whom it may concern:*

Be it known that I, THOMAS J. SLOAN, of the city, county, and State of New York, have invented a new and Improved Wood-Screw; and I do hereby declare that the following is a full, clear, and exact description of the principle or character which distinguishes it from all other things before known, and of the manner of making, constructing, and using the same, reference being had to the accompanying drawings, making part of this specification, in which—

Figure 2:
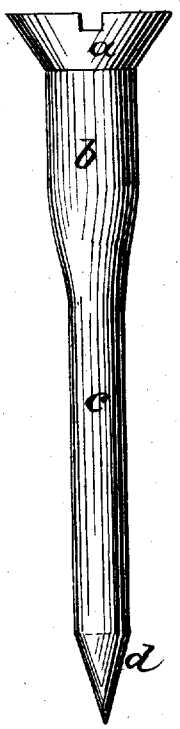
Figure 1:
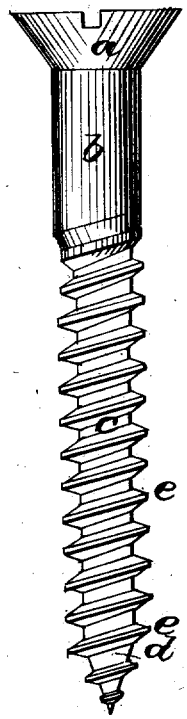

Figure 1 is an elevation of the screw as improved by me, and Fig. 2 a like elevation of the core thereof without the thread.

The same letters indicate like parts in all the figures.

Screws have heretofore been and are now generally made of equal diameter from end to end, or with a very slight taper along the threaded part. When thus formed, they hold with great force, each turn of the thread having its full hold, and each turn of the thread formed in the wood being fully sustained by the one above it; but such a screw cannot be inserted without first boring a hole in the wood, and if by chance the hole be not bored deep enough the difficulty of penetrating the solid wood will strain the thread already formed therein, and often strip it—a result often experienced by those who use wood-screws. With the view to avoid this, and to produce a screw that could penetrate the wood without boring, the screw has been made tapering at the point or from end to end of the threaded part; but in these cases the thread has either been made of the same depth along the conical part or gradually tapering—that is, decreasing in depth toward the point; but when made of a gradually less depth toward the point the distance between the turns of the thread has also been gradually diminished toward the point, and in the same or nearly the same ratio, in this way producing what is well known as the "gimlet-point." These two methods of making pointed screws are objectionable. When the thread has the same or nearly the same depth at the point that it has along the body, it presents a long lip projecting from the point of the core, which renders it difficult to insert the screw at the point required, for the same reason that a hole cannot be bored at any desired point with a bit having a side lip without a center point; and although the gimlet-pointed screw avoids this difficulty, it is at the expense of another equally bad, if not worse. The turns of the thread at the point being nearer together than along the body, they will not travel so "fast," as it is termed—that is to say, the turns of the thread along the body being farther apart than at the point, for every turn they will force the body of the screw faster than those at the point; hence those at the point become useless the moment the body enters the wood, and as a necessary consequence, after the screw has been entered, it will continue to penetrate with more ease without a thread on the point.

The object of my invention is to produce a pointed screw that will avoid the objections above referred to; and to this end my invention consists in making the thread of pointed screws of the same pitch along the body and point—that is, all the turns at equal distances apart—irrespective of the reduction of the diameter toward the point, when this is combined with the making of the thread of a gradually-reduced depth along the conical part, that the core and spiral of the thread may end at one and the same point, or nearly so.

In the accompanying drawings, *a* represents the head of the screw, and *b* the shank, both made in the usual manner.

The core *c* is made cylindrical, or nearly so, with a conical point, *d*, and the thread *e* is made with all the turns equally distant from one another, and gradually reduced in depth toward the apex of the cone into which it is merged. The cylindrical part should run into the conical part by a gradual curve. A screw thus formed, it will be seen, will penetrate the wood without the necessity of previously boring a hole, unless, indeed, the wood be very hard. It can be inserted at any point desired, and will continue to penetrate in the line in which it is started, and every portion of the thread will have the same progress, and the thread formed in the wood by that portion of the thread which is on the conical point will be adapted in pitch to receive the thread on the body of the screw, and therefore the thread on the point of the screw will tend to penetrate the wood when turned.

What I claim as my invention, and desire to secure by Letters Patent, is—

Making the thread of pointed screws of the same pitch along the body and point—that is, all the turns at equal distance apart—irrespective of the reduction of the diameter of the core at the point, substantially as described, when this is combined with the gradual reduction of the depth of the thread on the conical point and toward the apex thereof, substantially as described.

THOS. J. SLOAN.

Witnesses:
ALEXR. PORTER BROWNE,
CHS. M. KELLER.